United States Patent [19]

Matsuo et al.

[11] Patent Number: 4,674,101
[45] Date of Patent: Jun. 16, 1987

[54] ARC-HEATING TYPE EXTRA-FURNACE REFINING APPARATUS

[75] Inventors: Kazuhiko Matsuo; Teruyuki Hasegawa, both of Yokohama; Seigo Kuwano, Tokyo; Ryuji Yamaguchi, Yokohama; Akio Shiwata, Fukuyama; Yoneichi Hamada, Fukuyama; Yoshimi Komatsu, Fukuyama; Tsuneo Kondo, Fukuyama; Yusuke Shirotani, Fukuyama; Hirohisa Nakashima, Fukuyama; Yasuhiro Matsuda, Hiroshima, all of Japan

[73] Assignee: Nippon Kokan Kabushiki Kaisha, Tokyo, Japan

[21] Appl. No.: 782,525

[22] Filed: Oct. 1, 1985

[30] Foreign Application Priority Data

Oct. 12, 1984 [JP] Japan .................... 59-213338
Feb. 28, 1985 [JP] Japan .................... 60-39342
Mar. 14, 1985 [JP] Japan .................... 60-50943
Apr. 23, 1985 [JP] Japan .................... 60-85432

[51] Int. Cl.⁴ ............................ H05B 7/10
[52] U.S. Cl. .................................. 373/95
[58] Field of Search .......... 373/94, 95, 96, 100, 373/101

[56] References Cited

U.S. PATENT DOCUMENTS 3,539,692 11/1970 Heeney .................... 373/95
4,295,001 10/1981 Britton .................... 373/95
4,517,678 5/1985 Ball et al. ................ 373/95

FOREIGN PATENT DOCUMENTS 80335 1/1983 European Pat. Off. .
331249 1/1921 Fed. Rep. of Germany .
1069839 3/1955 Fed. Rep. of Germany .
1167992 4/1964 Fed. Rep. of Germany ........ 373/95

OTHER PUBLICATIONS

Research and Development in Japan, 1982, pp. 22-27, Okochi Memorial Fndn., Tokyo, JP; N. Ureshiyama et al: "Development of a Reduction Refining Process for Molten Steel in a Ladle Furnace—the LF Process", pp. 23-24.

Primary Examiner—Roy N. Envall, Jr.
Attorney, Agent, or Firm—Frishauf, Holtz, Goodman & Woodward

[57] ABSTRACT

The gap between an insertion hole formed in a covering of a ladle and an electrode inserted through the insertion hole is sealed by sealing means. The sealing means has a cap seal longitudinally and slidably fitted over the electrode. A base seal is hermetically disposed between the cap seal and the covering in such a manner that a gap is provided between the electrode and the base seal. The base seal has a gas injection nozzle intended to discharge a gas toward the electrode and another gas injection nozzle intended to discharge the gas downwardly. The use of the base and cap seals enables securing the sealing functions thereof despite any movement of the electrode, thus preventing the pickup of [N] as well as the reoxidation of molten steel. When a gas seal is effected by the formation of a flow of gas rotating around the electrode about the axis thereof, the sealing performance can be more enhanced. Further, when the base seal is cooled by causing cooling water to be circulated therethrough, its durability can also be enhanced.

5 Claims, 14 Drawing Figures

ARC-HEATING TYPE EXTRA-FURNACE REFINING APPARATUS

BACKGROUND OF THE INVENTION

The present invention relates to an arc-heating type extra-furnace refining apparatus arranged such that electrodes are immersed in slag on molten steel in a ladle to thereby form an arc between the electrodes and the molten steel to heat the molten steel. More particularly, the invention is concerned with an arc-heating type extrafurnace refining apparatus in which the sealability between the covering of the ladle and the electrodes is improved.

Figure 1:
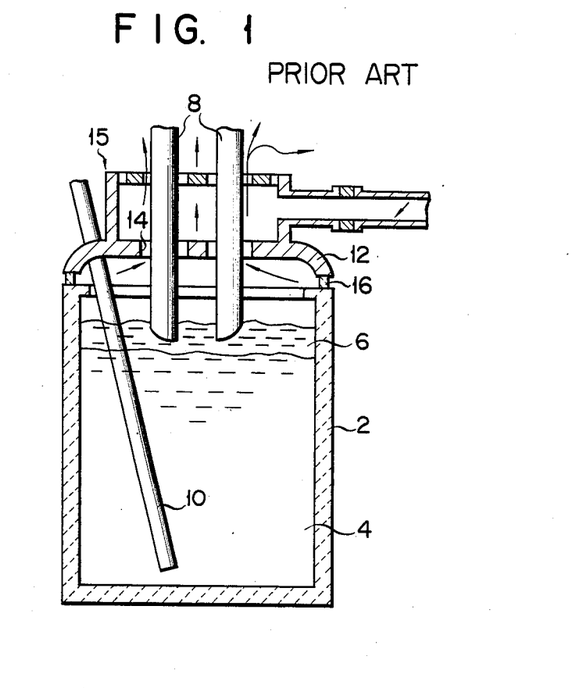
FIG. 1 is a sectional view showing a prior art arc-heating type extra-furnace refining apparatus.

In the arc process (hereinafter, referred to simply as "AP") of making an extra-furnace refinement of molten steel tapped from a converter, as shown in FIG. 1, electrodes 8 are immersed in a slag 6 on molten steel 4 charged into ladle 2 and an arc is formed between the molten steel and the electrodes to heat the molten steel. Simultaneously, lance 10 is immersed into the molten steel to thereby introduce a gas into the molten steel to stir the same. In this case, since lid or covering 12 is set on ladle 2, electrodes 8 and lance 10 are inserted into the ladle via insertion holes 14 provided in covering 12. At the top of ladle 2, dust collecting duct 15 is mounted, which is intended to collect exhaust gas containing the dust which is produced at the time of heating the molten steel or stirring the molten steel by bubbling or conducting powder injection.

Meanwhile, since electrodes 8 are kept at a high temperature and supplied with a high voltage, a small gap is allowed to exist between each electrode 8 and covering 12. For this reason, the flame which has been generated in the vicinity of the electrode portions within the ladle comes outside via the gaps. This flame causes an upward flow of the gas in the ladle as indicated in FIG. 1 by arrows which causes atmospheric air to be sucked into the ladle through, for example, seal 16 between covering 12 and ladle 2. As a result, reoxidation of the molten steel takes place in the ladle and, at the same time, the content of nitrogen [N] in the molten steel increases with the result that what is called "pickup" occurs.

Figure 2:
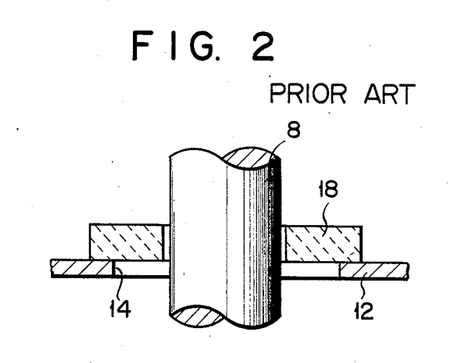
FIG. 2 is an enlarged view showing the electrode and its neighbouring zone of the refining apparatus shown in FIG. 1.

In order to prevent the occurrence of the [N] pickup phenomenon, as shown in FIG. 2, refractory board 18 made of ceramic fiber is disposed between electrodes 8 and the covering 12 to thereby seal the gap therebetween. This sealing means, however, has a drawback in that refractory board 18 fails to function as a sealing means in the final half of AP because it is damaged by the flame which has been generated in the beginning stage of arc-heating. For this reason, where the gap between the electrode and the covering is sealed with the use of the refractory board, a [N] pickup of 0.25 to 0.75 ppm/min. still occurs.

On the other hand, a method of blowing Ar gas onto the portions of electrodes 8 in the vicinity of insertion holes 14 to thereby seal the gap between the electrodes and the covering can also be contemplated as a countermeasure. This gas seal, however, fails to have a sufficient sealing function because the Ar gas is pushed upwards by the upward flow of gas coming out of insertion holes 14. For this reason, the conventional sealing means fails to sufficiently prevent the reoxidation of the molten steel as well as not preventing the pickup of [N] and, in addition, requires the use of a large amount of seal gas (Ar gas). In this old sealing means, it is necessary to use Ar gas of, for example, approximately 300 $Nm^3$/hour or more and this becomes a factor of increasing the refining cost.

SUMMARY OF THE INVENTION

The object of the invention is to provide an arc-heating extra-furnace refining apparatus which has improved sealability between the electrodes and the covering of a ladle involved, thereby enabling the prevention of [N] pickup as well as eliminating the reoxidation of molten steel, and thereby enabling a reduction in the amount of sealing gas used.

An arc-heating extra-furnace type refining apparatus in accordance with the present invention comprises a ladle capable of having molten steel received therein, rod-like electrodes which are immersed into the slag on the molten steel within the ladle so as to form an arc between the electrodes and the molten steel, a ladle covering having insertion holes permitting the insertion of the electrodes, and sealing means which is disposed on the insertion holes, and which has a first sealing member slidably fitted onto the electrode in the longitudinal direction thereof and a second sealing member disposed in such a manner as to hermetically seal both the first sealing member and the ladle covering and to provide a gap between the second sealing member and the electrode.

According to the present invention, it is possible to permit the ladle interior to be maintained in a highly sealed condition and arc-heat the molten steel in this condition. And yet, this type of sealing does not deteriorate with the lapse of treating time. Further, even when the electrode is moved about, the condition of sealing can be maintained. As a result, the degree to which the [N] pickup in the molten steel occurs during the arc process (AP) can be descreased down to 0.05 ppm/min. or less.

DETAILED DESCRIPTION OF THE PREFERRED EMBODIMENTS

Figure 3:
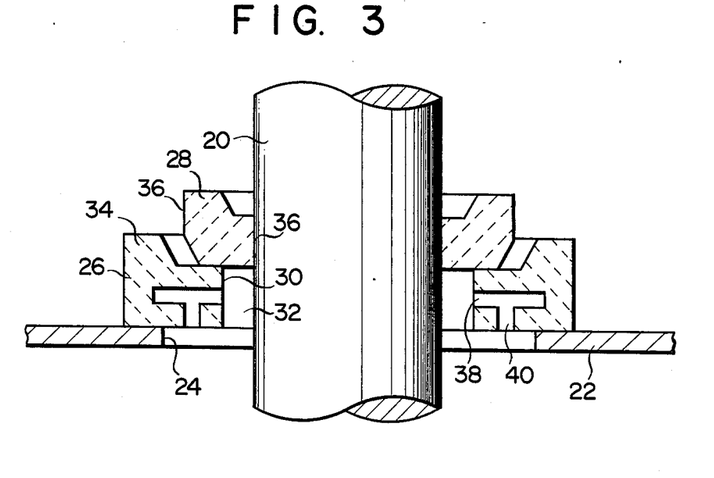
FIG. 3 is an enlarged view showing the electrode and its neighbouring zone of an arc-heating type extra-furnace refining apparatus in accordance with a first embodiment of the invention.
Figure 4:
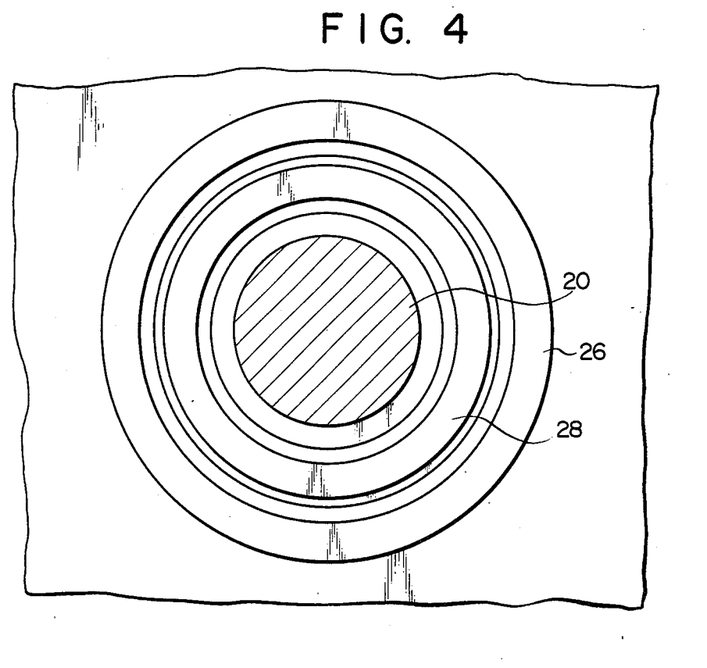
FIG. 4 is a plan view of FIG. 3.

In the first embodiment of the invention shown in FIGS. 3 and 4, rod-like electrode 20 is inserted into the ladle via insertion hole 24 which is formed in covering 22 of the ladle and which is circular in cross section. On covering 22 in vicinity of the insertion hole 24, annular base seal 26 is installed, which constitutes a second sealing member. On this base seal 26, annular cap seal 28 constituting the first sealing member is installed in a manner that it is slidable with respect to base seal 26. Base seal 26 has an inner diameter greater than the outer diameter of electrode 20 and an outer diameter greater than the diameter of insertion hole 24. Base seal 26 is installed on covering 22 in a manner such that it is inserted over electrode 20 so that small gap 32 may be formed between its inner peripheral surface 30 and the outer surface of electrode 20. Annular embossed portion 34 is formed on the outer peripheral edge portion of base seal 26 over the entire circumference thereof. Cap seal 28 has an inner diameter substantially equal to the diameter of the electrode 20. Accordingly, cap seal 28 has its inner peripheral surface 36 in to slidable contact with electrode 20 and thus is made movable in the longitudinal direction thereof. On the other hand, the outer diameter of cap seal 28 is greater than the inner diameter of base seal 26. For this reason, cap seal 28 can be engaged with base seal 26. Further, since outer peripheral surface 36 of cap seal 28 is smaller in diameter than the inner wall surface of embossed portion 34, cap seal 28 can slide on the base seal 26 in the area surrounded by annular embossed portion 34.

Base seal 26 and cap seal 28 can be formed using, for example, a refractory having a composition of, alumina ($Al_2O_3$) 90%-silica ($SiO_2$) 10%.

Base seal 26 is formed in inner peripheral surface 30 with horizontal injection nozzles 38 permitting gas to be horizontally injected toward electrode 20, and is also formed on its underside with vertical injection nozzles 40 permitting gas to be downwardly injected. These injected nozzles 38 and 40 are connected with an external gas supply source for supplying an inert gas such as, Ar gas. That is, Ar gas is discharged by way of injection nozzles 38 to form a purge in the horizontal direction to thereby provide a horizontal gas seal. Additionally, Ar gas is discharged by way of injection nozzles 40 to form a purge in the vertical direction to thereby provide a vertical gas seal as well.

In the arc-heating type extra-furnace refining apparatus having the above-mentioned construction, when the molten steel is arc-heated using the arc formed between the molten steel and electrodes 20, the flame within the ladle is prevented from coming outside the same and any upward flow of gas passing through the insertion hole is also prevented from occurring since the electrode 20 is hermetically connected with covering 22 by means of cap seal 28 and base seal 26. Accordingly, suction of any atmospheric air into the ladle is prevented and thus it is possible to minimize [N] pickup as well as the reoxidation of the molten steel.

Further, cap seal 28 is kept in contact with electrode 20 and is light in weight and small in size. Therefore, even when electrode 20 is moved horizontally, cap seal 28 can slide on base seal 26 in a manner to follow electrode 20. Even in such a case, therefore, a state of sealing can be maintained between electrode 20 and covering 22. On the other hand, when electrode 20 is vertically moved, cap seal 28 can slide along electrode 20 in the longitudinal direction thereof. In this case as well, therefore, the state of sealing can be maintained.

Further, according to this first embodiment, since the Ar gas is discharged through injection nozzles 38 to form a horizontal gas seal, the flame which rises upwards from the interior of the ladle is cut off by such horizontal gas seal. Further, since the Ar gas is discharged through injection nozzles 40 to form a vertical gas seal, even when the molten steel is splashed upwards over the zone located in the vicinity of insertion hole 24, the splashed steel is prevented from clinging to electrode 20 or covering 22.

In this way, according to the present invention, it is possible to avoid the occurrence of any operational trouble as well as to prevent not only the occurrence of [N] pickup but also the reoxidation of the molten steel. Table 1 below shows examples in which molten steel is arc heated using the arc-heating type extra-furnace refining apparatus in accordance with the first embodiment of the invention, while Table 2 below shows comparative examples in which molten steel is arc heated using a prior art refining apparatus.

TABLE 1

| No. | Treating Time In AP | Content of [N] Pick-up | Rate of [N]— Pick-up | Flowrate of Ar Gas | Secondary Voltage |
| --- | --- | --- | --- | --- | --- |
| 1 | 45 | 2 | 0.04 | 250 | 360 |
| 2 | 52 | 1 | 0.02 | 200 | 310 |
| 3 | 50 | 0 | 0 | 200 | 310 |
| 4 | 48 | 2 | 0.04 | 230 | 360 |
| 5 | 42 | 1 | 0.02 | 240 | 360 |
| 6 | 39 | 0 | 0 | 230 | 410 |
| 7 | 55 | 1 | 0.02 | 180 | 310 |
| 8 | 48 | 2 | 0.04 | 190 | 360 |
| 9 | 49 | 0 | 0 | 200 | 360 |
| 10 | 39 | 0 | 0 | 200 | 410 |
| 11 | 54 | 1 | 0.02 | 230 | 310 |
| 12 | 56 | 0 | 0 | 200 | 310 |
| 13 | 50 | 2 | 0.04 | 190 | 310 |
| 14 | 49 | 1 | 0.02 | 200 | 360 |
| 15 | 47 | 2 | 0.04 | 230 | 360 |
| 16 | 55 | 1 | 0.02 | 220 | 310 |
| 17 | 35 | 1 | 0.03 | 200 | 410 |
| 18 | 53 | 0 | 0 | 210 | 310 |
| 19 | 48 | 0 | 0 | 220 | 360 |
| 20 | 55 | 1 | 0.02 | 170 | 310 |
| 21 | 45 | 1 | 0.02 | 190 | 360 |

TABLE 2

| No. | Treating Time For Ar Gas | Content of [N] Pick-up | Speed of [N]— Pick-up | Flowrate of Ar Gas | Secondary Voltage |
| --- | --- | --- | --- | --- | --- |
| 1 | 51 | 23 | 0.45 | 300 | 310 |
| 2 | 50 | 13 | 0.26 | 300 | 310 |
| 3 | 45 | 26 | 0.58 | 280 | 360 |
| 4 | 46 | 19 | 0.41 | 290 | 360 |
| 5 | 52 | 17 | 0.33 | 280 | 310 |
| 6 | 55 | 16 | 0.29 | 280 | 310 |
| 7 | 49 | 35 | 0.71 | 280 | 360 |
| 8 | 48 | 34 | 0.71 | 310 | 360 |
| 9 | 51 | 32 | 0.63 | 300 | 310 |
| 10 | 42 | 21 | 0.50 | 290 | 360 |

In the above Tables 1 and 2, the treating time in AP is expressed in units of minutes; the [N] pick up content in units of ppm; the rate of [N] pickup in units of ppm/min.; the flowrate of Ar gas in units of Nl/min.; and the level of secondary voltage in units of volts. Further, the ladle has a volume of 250 tons; the electrode has a diameter of 18 inches; and the maximum rate at which the temperature of molten steel is raised is 4.5° C./min.

Figure 5:
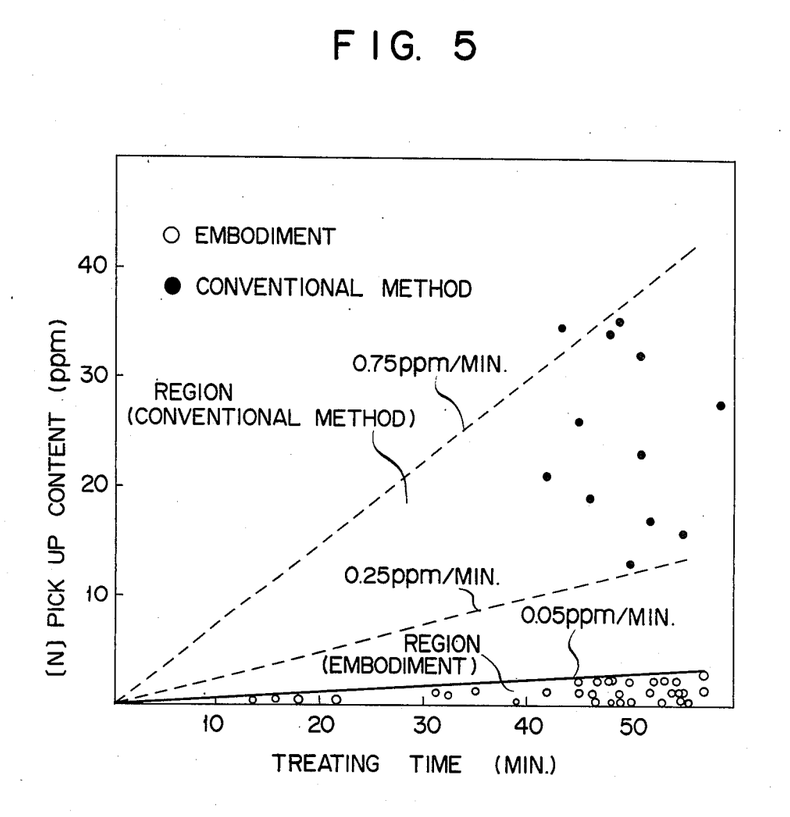
FIG. 5 is a graph showing the effect which is obtained with the use of the refining apparatus shown in FIG. 3.

The results of the above mentioned examples and comparative examples are shown in FIG. 5 in which the treating time in AP is plotted on the abscissa and the [N] pick up content (ppm) on the ordinate. As apparent from Tables 1 and 2 and the graph shown in FIG. 5, according to the examples of the invention, the speed of [N] pickup is as low as 0 to 0.05 ppm/min. and the increase in [N] content per treatment is as small as 0 to 2 ppm. In contrast, according to the comparative examples, the speed of [N] pickup is as high as 0.25 to 0.75 ppm/min. and the increase in [N] content per treatment is as large as 13 to 35 ppm.

Figure 6:
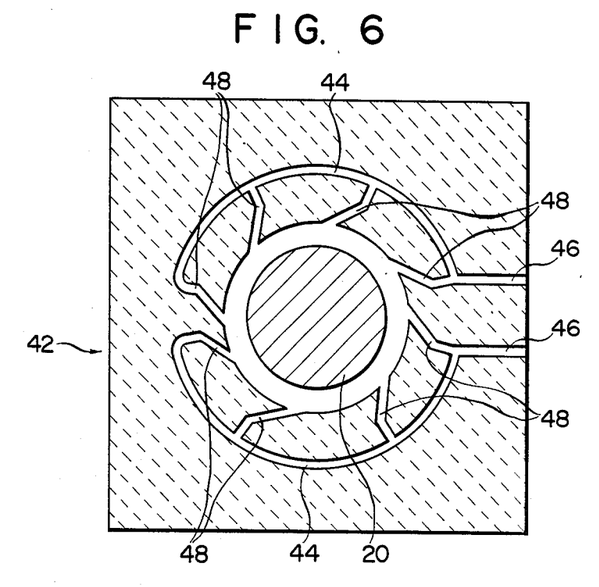
FIG. 6 is a plan view showing the electrode and its neighbouring zone of an arc-heating type extra-furnace refining apparatus in accordance with a second embodiment of the invention.
Figure 7:
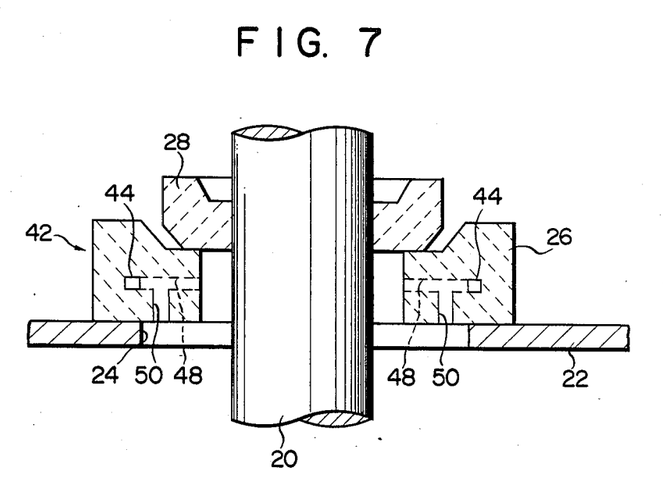
FIG. 7 is a vertical sectional view of FIG. 6.

A second embodiment of the invention will now be described. This second embodiment differs from the preceding first embodiment in that the direction of ejecting a seal gas is so set as to cause the flow thereof to rotate around the electrode; about the lengthwise axis thereof. This enables the enhancement of the sealability and, at the same time, enables a reduction in the amount of the seal gas used. FIGS. 6 and 7 show an arc-heating type extra-furnace refining apparatus in accordance with the second embodiment of the invention. In these figures, the same parts or portions and members as those used in FIGS. 3 and 4 (first embodiment) are denoted by like reference numerals, and description thereof is omitted.

Base seal 42 is formed on the interior with a pair of gas flow passages 44 along the half circles using electrode 20 as their center. The gas flow passages 44 being connected to an external gas supply source via gas supply passages 46. Each gas flow passage 44 is formed with a plurality of horizontal injection nozzles 48 extending in the horizontal direction, as well as a plurality of vertical injection nozzles 50 extending in the vertical direction. From horizontal injection nozzles 48, the gas is purged in the horizontal direction, thereby to intercept the flame rising upwards from inside the ladle. On the other hand, from vertical injection nozzles 50, the gas is purged in the vertical direction, thereby to prevent the molten steel from being splashed over, and clinging to insertion hole 24. This prevents sparking from electrode 20.

Figure 8:
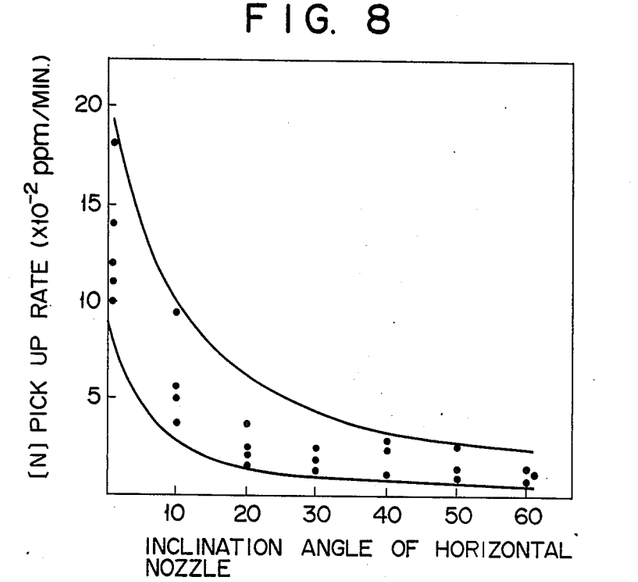
FIGS. 8 and 9 are graphs which show the effects obtainable with the use of the refining apparatus shown in FIG. 6.

Each horizontal injection nozzle 48 is inclined at a specified angle with respect to the direction extending from gas flow passage 44 toward the center of electrode 20, whereby the gas discharged from horizontal injection nozzle 48 into the gap between base seal 42 and electrode 20 can flow in the same direction in such a manner as to rotate around electrode 20, about the lengthwise axis thereof. This rotational flow of the gas cuts off the upward flow of gas from inside the ladle. In order to form a sufficient rotational flow of gas around electrode 20, horizontal discharge bore 48 preferably is provided at least four in number along the half circles. FIG. 8 is a graphic diagram showing the relationship between the direction of discharge of the horizontal discharge bore 48 and the sealing characteristic, which holds true where the flowrate of inert gas is 100 Nm$^3$/hour. In FIG. 8, the abscissa represents the angle at which the discharging direction of the horizontal discharge bore 48 is inclined with respect to the direction extending toward the center axis of the electrode 20 while, on the other hand, the ordinate represents the speed of [N] pick-up as expressed in terms of ($\times 10^{-2}$ ppm/min.). That is, where the angle of inclination of the horizontal discharge bore 48 is 0°, the flow of the gas ejected therefrom advances toward the electrode 20. As the angle of inclination increases, the flow of gas is greatly inclined from the direction extending toward the center axis of the electrode 20. As clear from FIG. 8, while the speed of [N] pick-up is as high as 0.1 to 0.2 ppm/min. in case where the angle of inclination is 0°, the speed of [N] pick-up becomes lower as the angle of inclination increases to cause the formation of a stronger rotational flow of inert gas. As seen in FIG. 8, if the horizontal discharge bore 48 is inclined at an angle of 10° or more with respect to the direction extending toward the electrode 20, then the rate of pick-up of [N] can be greatly slowed down as compared with a case where the flow of the gas discharged is directed toward the electrode 20.

With the arc-heating type extra-furnace refining apparatus having the above-mentioned construction, molten steel is arc heated using an arc formed between electrode 20 and the molten steel, flame rises from inside the ladle toward electrode insertion hole 24 the molten steel is splashed toward electrode hole 24. However, inert gas is being supplied into gas flow passages 44 via gas supply passages 46 connected with the external gas supply source, the inert gas being discharged on and around electrode 20 via horizontal injection nozzles 48 and vertical injection nozzles 50. The inert gas discharged from vertical injection nozzles 50 is vertically discharged downwards, thereby to prevent the molten steel from splashing toward electrode insertion hole 24 and from clinging in the neighbourhood of insertion hole 24. On the other hand, the inert gas which is discharged from horizontal nozzles 48 into the annular gap between electrode 20 and base seal 42 flows in such a manner as to rotate in one direction (in the counterclockwise direction in FIG. 6) around electrode 20. This horizontal rotational flow of inert gas acts to cut off the flame rising upwards from inside the ladle, thereby preventing any upward flow of gas passing through insertion hole 24. Accordingly, the interior of the ladle is kept under positive pressure due to the Ar gas and any atmospheric air is prevented from being sucked into the ladle from between the covering and the ladle. For these reasons, the molten steel is prevented from being reoxidated and, at the same time, from undergoing the pickup of [N].

Figure 9:
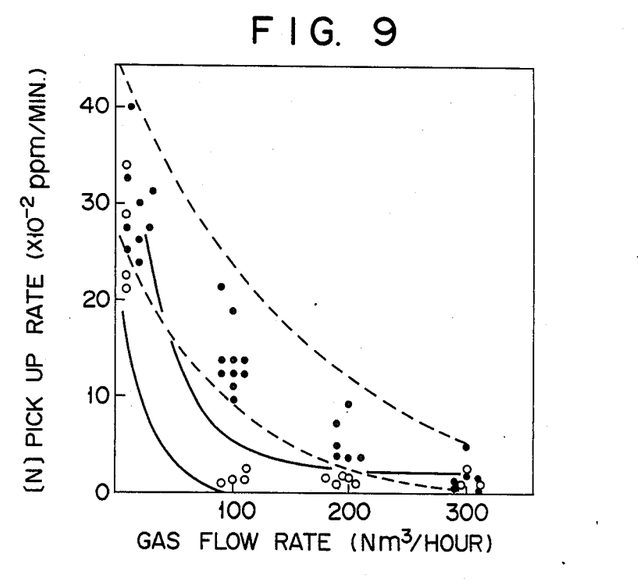

FIG. 9 is a graphic diagram showing the effect of the invention, showing the relationship between the amount of inert gas discharged and the rate of pickup of [N] in the case of using the gas sealing means described hereinabove in connection with the second embodiment of the invention. Measurement data was obtained when molten steel was heated at a maximum molten-steel temperature raising rate of 4.5° C./min. by using an arc-heating type extra-furnace refining apparatus in which the ladle has a capacity of 250 tons; the transformer has a capacity of 35,000 kVA; the secondary voltage has a level of 310 to 510 V; and the electrode has a diameter of 18 inches. In the graph of FIG. 9, the circles represent the measurement data which have been obtained when the gas discharging direction is inclined with respect to the direction extending toward the electrode in accordance with this second embodiment, while the dots represent the measurement data which have been obtained by blowing the gas toward the gap between the electrode and the covering as in conventional method. The arc heating time is 40 to 55 minutes with respect to each measurement. As clear from FIG. 9, when the gas discharging direction is in conformity with the direction extending toward the center axis of the electrode, the discharging flow of gas collides directly against the surface of the electrode, so that the gas flow loses most of its force. For this reason, the sealing inert gas is pushed upwards by the flow of gas rising from inside the ladle, failing to check the intra-ladle flow of gas advancing toward the insertion hole. For this reason, as seen in FIG. 9, conventionally, the rate of [N] pickup is high and in order to decrease the [N] pickup rate down to a value of 0.05 ppm/min., it is necessary to supply and discharge the inert gas at the rate of 300 $Nm^3$/hour. In contrast, according to the invention, when the discharging amount of inert gas is 100 $Nm^3$/hour or more, the [N] pickup rate is 0.05 ppm/min. or less. That is, according to the invention, it is possible to suppress the [N] pickup rate below the quite small value of 0.05 ppm/min. This is because, in the present invention, the inert gas discharged from horizontal injection nozzles 48 forms a strong rotational flow around electrode 20 to thereby effectively cut off the flame and upward gas flow occurring from inside the ladle.

As stated above, according to this second embodiment, a strong rotational flow of inert gas is formed around the portion of the electrode in the vicinity of the insertion hole. For this reason, it is possible to maintain high sealability between the electrode and the covering to be to thereby effectively cut off the flame and upward gas flow occurring from inside the ladle. Accordingly, it is possible to maintain the interior of the ladle under positive pressure to thereby prevent and atmospheric air from being sucked into the ladle. Accordingly, it is possible to effectively prevent the pickup of [N] in the molten steel as well as the reoxidation of the same. Accordingly, it is also possible to decrease the amount of inert gas intended for use in sealing and thereby to reduce the refining cost.

Figure 10:
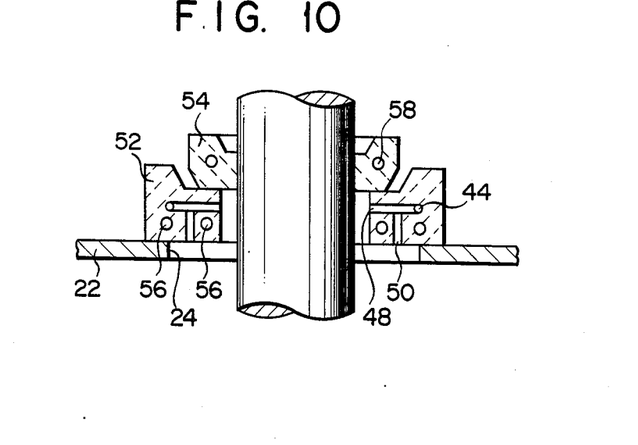
FIG. 10 is an enlarged sectional view showing the electrode and its neighbouring zone of an arc-heating type extra-furnace refining apparatus in accordance with a third embodiment of the invention.
Figure 11:
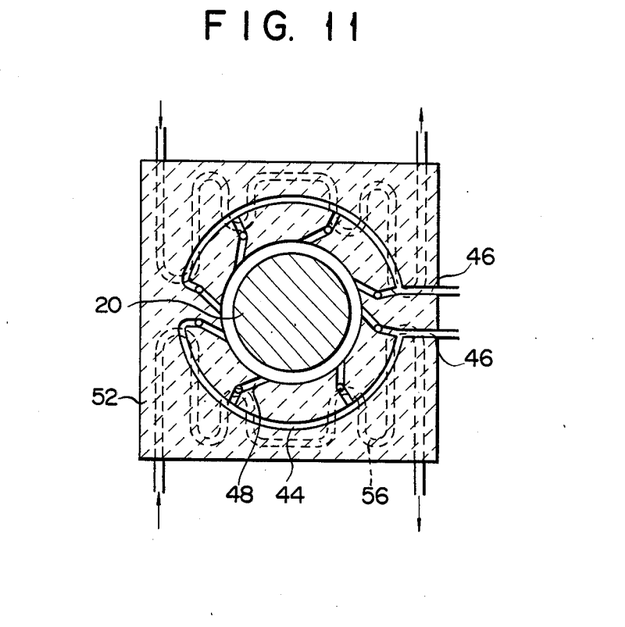
FIG. 11 is a plan view of the refining apparatus shown in FIG. 10.

Next, a third embodiment of the invention will be described with reference to FIGS. 10 and 11. In this third embodiment, the base seal member designed to eject the seal gas is made into a water-cooled structure with the aim of lengthening its service life. Base seal 52 is formed with cooling water passages 56. These passages are formed in such a manner as to pass through almost all of the central region of base seal 52 (as viewed in the thickness wise direction) without crossing gas passages 44 and 48. Further, cap seal 54 also is formed with cooling water passage 58.

Figure 12:
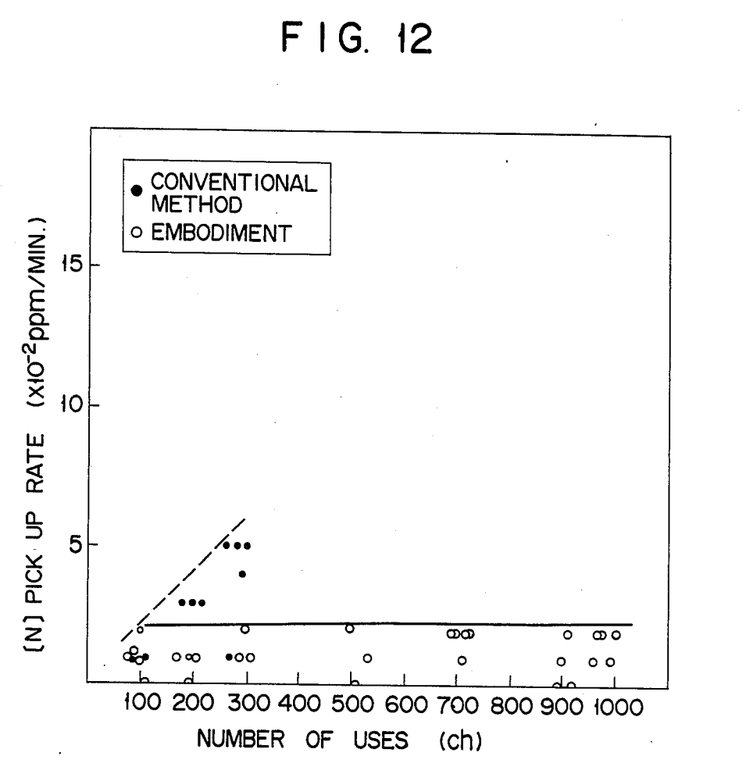
FIG. 12 is a graph which shows the effect obtained with the use of the refining apparatus shown in FIG. 10.

In the arc process (AP), after the covering is set on the ladle in which molten steel is received, cooling water is caused to flow through cooling-water passages 56 and 58, thereby cooling base seal 52 and cap seal 54. Subsequently, while base seal 52 and cap seal 54 are thus being cooled by water, seal gas is caused to flow through gas passages 44 and 48 to thereby seal the electrode, thus facilitating the arc process. Due to the water cooling procedure base seal 52 and cap seal 54 are prevented from being impaired or damaged from the heat of the molten steel and arc. That is, where the refining apparatus has no water-cooled structure, the base seal and cap seal are thermally damaged to a comparatively large extent and must actually be replaced after 150 to 200 charges. According to this third embodiment, however, the rate at which the base seal and cap seal are thermally worn is very low, enabling their use in up to approximately 1000 charges. FIG. 12 shows the relationship between the frequency of uses of the base seal and cap seal and the [N] pickup rate, by comparing the use of the base seal and cap seal in accordance with this third embodiment with the use of the base seal and cap seal having no water-cooled structure. As seen in FIG. 12, according to this embodiment, it is possible to stably maintain the [N] pickup rate at small values and any measurable increase in the [N] pickup rate was not recognized until after approximately 1000 charges was completed. Similarly, it is also possible to simultaneously suppress the reoxidation of the molten steel.

Figure 13:
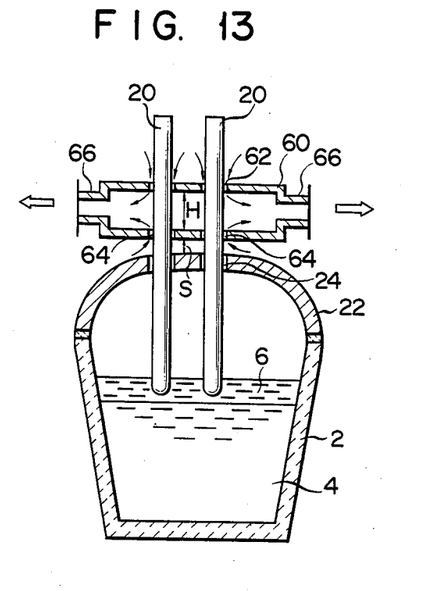
FIG. 13 is a sectional view of an arc-heating type extra-furnace refining apparatus in accordance with a fourth embodiment of the invention; and, FIG. 14 is a plan view of the refining apparatus shown in FIG. 13.
Figure 14:
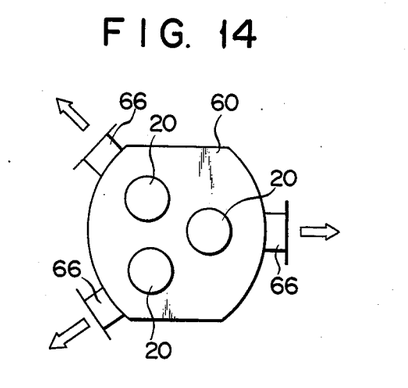

Next, a fourth embodiment of the invention will be described. This fourth embodiment is directed toward improving the dust collection hood installed above the ladle so as to decrease the pickup of [N] in the molten steel. That is, as shown in FIG. 1, a conventional dust collection hood is provided on ladle 2 in such a manner as to cover the ladle. This hood, however, is opened at the bottom and is mounted directly on covering 12. For this reason, when the amount of suction air intended for dust collection is increased, a negative pressure is produced within the ladle which promotes the attraction of atmospheric air into the ladle. As a result, the rate of pickup of [N] in the molten steel is increased. The fourth embodiment is intended to eliminate this problem. Referring to FIGS. 13 and 14 showing the fourth embodiment of the invention, dust collection hood body 60 is shaped like a box and is installed above ladle covering 22 with specified gap S being provided between hood body 60 and covering 22. This gap is constituted of a layer of atmospheric air. Electrodes 20 are passed through body 60. Electrode holes 62 are formed at the upper side of the body 60 and electrode holes which serve as suction holes 64 are formed at the lower side. Accordingly, suction holes 64 are provided above insertion holes 24 of ladle covering 22. Body 60 can have any given height H which permits any upward flow of exhaust gas to be sufficiently trapped inside the body. Body 60 is formed at the side periphery with joint ports 66 to which dust collection ducts are connected. Joint ports 66 are provided in the number equal to that of suction holes 64. Since, in this embodiment, the number of electrodes 20 or suction holes 64 is three, the number of joint ports 66 is also three.

With the above-mentioned construction, the exhaust gas containing dust therein which is discharged from insertion holes 24 is sucked into body 60 via suction holes 64. Since body 60 can have any given height large enough to permit the exhaust gas to be sufficiently trapped inside body 60, the exhaust gas is effectively trapped inside body 60 and is sent from joint ports 66 to the dust collection ducts. Since joint ports 66 are provided in number equal to that of suction holes 64, the dust collection is also effectively performed.

Body 60 is box-shaped and therefore has excellent airtightness, so that the suction is performed efficiently. Further, body 60 is mounted above ladle covering 22 in such a manner that it is spaced away from the latter without making contact thereto. As a result, the interior of ladle 2 is prevented from having a negative pressure, so that the attraction of air into the ladle is impossible.

Consequently, it is possible not only to enhance the dust collection efficiency but also to prevent nitrogen gas from being picked up by the molten steel.

According to the experiments performed by the present inventors, it has been proved that, in the case of the prior art dust collection hood 15 (FIG. 1), even when the dust collection damper has an opening of 100%, dust escapement is considerable. In the case of the above-mentioned present dust collection hood, however, sufficient dust collection is possible with the dust collection damper having an opening of only 70 to 80%. Further, the dust collection hood is also followed by a remarkable power reduction required by the dust collector blower involved. Furthermore, the use of this dust collection hood made it possible to reduce the (N) pickup speed from 0.30 ppm/min., which is a conventional value, down to 0.10 ppm/min. which is approximately $\frac{1}{3}$ of the former value.

What is claimed is:

1. An arc-heating type extra-furnace refining apparatus comprising:
    a ladle capable of receiving molten steel therein;
    a rod-like electrode adapted to be immersed into slag on molten steel within the ladle so as to form an arc between the electrode and the molten steel;
    a covering over the ladle having insertion holes accommodating the electrode therein;
    sealing means disposed on the insertion holes and having a first sealing member slidably fitted onto the electrode in the longitudinal direction thereof and a second sealing member disposed in such a manner as to hermetically seal both the first sealing member and the ladle covering and provide a gap between the second sealing member and the electrode;
    the second sealing member having an inclined gas injection nozzle formed in the second sealing member and aligned to discharge a jet of gas in a direction inclined at an angle of at least 10° away from a plane which includes the axis of the electrode, whereby the gas in injected from the inclined gas injection nozzle to form a flow rotating around the electrode; and
    gas supplying means for supplying a gas to the inclined gas injection nozzle for discharge therefrom at a rate of at least 100 $Nm^3$/hour.

2. An arc-heating type extra-furnace refining apparatus according to claim 1, wherein the second sealing member has a downward gas injection nozzle formed in the second sealing member which discharges the gas downwardly.

3. An arc-heating type extra-furnace refining apparatus according to claim 1, wherein the second sealing member has a cooling water passage formed in the second sealing member and intended to permit the flow of cooling water therethrough.

4. An arc-heating type extra-furnace refining apparatus according to claim 1, which further comprises a dust collection hood installed above the covering, and a suction device for sucking the gas from the dust collection hood, the dust collection hood having a box-like body and installed in such a manner as to be separated from the ladle covering, the body having an insertion hole permitting the insertion of the electrode therethrough.

5. An arc-heating type extra-furnace refining apparatus according to claim 4, wherein the body has a plurality of suction ports communicating with the suction device.

* * * * *